(12) United States Patent
Xu et al.

(10) Patent No.: US 12,078,206 B2
(45) Date of Patent: Sep. 3, 2024

(54) PRESSURE PLATE BEARING DEVICE ASSEMBLED BY QUICK CONNECTION

(71) Applicant: C&U COMPANY LIMITED., WenZhou (CN)

(72) Inventors: Jialiang Xu, WenZhou (CN); Xuefeng Bai, WenZhou (CN); Shuwu Zhang, WenZhou (CN)

(73) Assignee: C&U COMPANY LIMITED., Wenzhou (CN)

( * ) Notice: Subject to any disclaimer, the term of this patent is extended or adjusted under 35 U.S.C. 154(b) by 0 days.

(21) Appl. No.: 17/911,137

(22) PCT Filed: Sep. 16, 2021

(86) PCT No.: PCT/CN2021/118720
§ 371 (c)(1),
(2) Date: Sep. 13, 2022

(87) PCT Pub. No.: WO2023/272955
PCT Pub. Date: Jan. 5, 2023

(65) Prior Publication Data
US 2024/0200595 A1   Jun. 20, 2024

(30) Foreign Application Priority Data

Jun. 29, 2021   (CN) .......................... 202110725370.1

(51) Int. Cl.
*F16C 19/55* (2006.01)
*F16C 33/58* (2006.01)
(Continued)

(52) U.S. Cl.
CPC ............ *F16C 19/55* (2013.01); *F16C 33/586* (2013.01); *F16C 35/045* (2013.01); *F16C 35/077* (2013.01); *F16C 2223/60* (2013.01)

(58) Field of Classification Search
CPC ...... F16C 19/55; F16C 33/586; F16C 35/077; F16C 2226/60; F16C 19/507
See application file for complete search history.

(56) References Cited

U.S. PATENT DOCUMENTS 3,011,364 A * 12/1961 Mims ...................... F16H 13/08
475/904
4,664,539 A * 5/1987 Li ........................... F16C 19/55
384/461

(Continued)

FOREIGN PATENT DOCUMENTS

CN          204985367 U       1/2016
CN          105736583 A       7/2016
(Continued)

*Primary Examiner* — James Pilkington
*Assistant Examiner* — Aimee Tran Nguyen
(74) *Attorney, Agent, or Firm* — Bayramoglu Law Offices LLC

(57) ABSTRACT

A pressure plate bearing device assembled by quick connection includes a bearing and a pressure plate. The pressure plate includes a sleeving hole which sleeves outside an outer race of the bearing, a limiting groove provided in a position where the outer race of the bearing is nested in the sleeving hole in a matching manner, and a steel ball arranged in the limiting groove. Based on the limiting match between the steel ball and the sleeving hole and that between the steel ball and the outer race of the bearing, at least the axial limit between the bearing and the pressure plate is at least fulfilled. The outer race of the bearing or the pressure plate is provided with a mounting channel that is in communication with the limiting groove. The pressure plate bearing device assembled by the quick connection is more easily assembled and reliably connected.

10 Claims, 4 Drawing Sheets

(51) Int. Cl.
*F16C 35/04* (2006.01)
*F16C 35/077* (2006.01)

(56) References Cited

U.S. PATENT DOCUMENTS

| | | | |
|---|---|---|---|
| 2009/0154858 A1 | 6/2009 | Horvat | |
| 2014/0226928 A1* | 8/2014 | Metrikin | F16C 33/3806 384/523 |
| 2015/0323003 A1* | 11/2015 | Lee | F16C 19/55 384/512 |

FOREIGN PATENT DOCUMENTS

| | | |
|---|---|---|
| CN | 107806473 A | 3/2018 |
| CN | 207961279 U | 10/2018 |
| CN | 110985787 A | 4/2020 |
| CN | 111156257 A | 5/2020 |
| CN | 212928508 U | 4/2021 |
| DE | 102010047983 A1 | 4/2012 |
| JP | 2005042894 A | 2/2005 |
| JP | 2018135971 A | 8/2018 |

* cited by examiner

PRESSURE PLATE BEARING DEVICE ASSEMBLED BY QUICK CONNECTION

CROSS-REFERENCE TO RELATED APPLICATIONS

This application is the national phase entry of International Application No. PCT/CN2021/118720, filed on Sep. 16, 2021, which is based upon and claims priority to Chinese Patent Application No. 202110725370.1, filed on Jun. 29, 2021, the entire contents of which are incorporated herein by reference.

TECHNICAL FIELD

The present disclosure relates to a pressure plate bearing device assembled by quick connection.

BACKGROUND

At present, there is difficulty in matching the pressure plate and the bearing outer race of the pressure plate bearing device for a connection. There are two common methods to achieve the connection and match between the pressure plate and the bearing. The first method is to connect and fix the pressure plate to the bearing by welding and riveting, and the second method is to clamp the pressure plate and the bearing by means of a clamp ring. The first method is relatively troublesome in operation. In the second method, when the pressure plate and the bearing are transported or subject to vibration, the pressure plate is likely to disconnect (i.e., separate, fall off) from the bearing. Besides, when the pressure plate bearing device is subjected to a large impact load during operation, a stress concentration occurs in the groove of the outer race of the bearing that connects with the clamp ring, and the stress concentration leads to the fracture of the outer race of the bearing and the premature failure of a product. Due to the strict requirements for production, transportation, and customer use regarding the usage of the conventional pressure plate bearing device, the previously designed structure is not suitable for mass production. Therefore, it is necessary to optimize and adjust the connection between the pressure plate and the bearing of a pressure plate bearing structure.

SUMMARY

The objective of the present disclosure is to overcome the shortcomings of the prior art by providing a pressure plate bearing device that is easy to assemble and provides a more reliable connection.

To achieve the above objective, the present disclosure provides a pressure plate bearing device assembled by quick connection, which includes a bearing and a pressure plate. The pressure plate includes a sleeving hole that sleeves outside an outer race of the bearing; a limiting groove formed in the position where the outer race of the bearing is nested in the sleeving hole in a matching manner, and a steel ball arranged in the limiting groove. Based on the limiting match between the steel ball and the sleeving hole and between the steel ball and the outer race of the bearing, at least the axial limit between the bearing and the pressure plate is fulfilled. The outer race of the bearing or the pressure plate is provided with a mounting channel that is in communication with the limiting groove, and a limiting member capable of limiting and holding the steel ball in the limiting groove is arranged in the mounting channel.

Further, the mounting channel is formed in the pressure plate, and the limiting groove includes an annular rolling groove formed in an outer circumferential surface of the outer race of the bearing and a groove formed in an inner circumferential surface of the sleeving hole of the pressure plate.

Further, the mounting channel includes a radial extension section and an axial extension section. One end of the radial extension section is connected to the inner circumferential surface of sleeving hole, and the axial extension section is provided with a mounting hole at an axial end face on at least one side of the pressure plate. The limiting member is fixed into the axial extension section in a penetrating manner and abuts against the steel ball in a matching manner for a limit, and the groove is formed at one end of the radial extension section.

In another optional scheme, the mounting channel includes a radial extension section and an axial extension section. One end of the radial extension section is connected to the inner circumferential surface of the sleeving hole. The axial extension section is provided with a mounting hole at an axial end face on at least one side of the pressure plate. The limiting member is fixed into the axial extension section in a penetrating manner. A ball support is movably arranged in the radial extension section. One end of the ball support is provided with a ball socket in rolling contact with the steel ball in a matching manner, and the other end of the ball support abuts against the limiting member in a matching manner to form a limit.

Further, a screw fixed into the axial extension section by a threaded connection is adopted as the limiting member.

Further, the other end of the ball support is provided with a concave part that fits a rod part of the screw, and an inner side of the concave part and an inner circumferential wall of the axial extension section are provided with fitting threads.

In another optional scheme, the mounting channel is formed in the pressure plate, and the limiting groove includes a first annular rolling groove formed in an outer circumferential surface of the outer race of the bearing and a second annular rolling groove formed in an inner circumferential surface of the sleeving hole of the pressure plate.

Further, one end of the mounting channel is connected to the second annular rolling groove, and the other end of the mounting channel is connected to an axial end face on a side of the pressure plate to form a mounting hole in the axial end face, and the limiting member is arranged at the mounting hole.

Further, the mounting channel is arranged obliquely.

Further, a guide part is arranged at the mounting hole.

The present disclosure has the following beneficial effects: The steel ball can be conveniently mounted into the limiting groove via the mounting channel and can be stably held in the limiting groove in coordination with the limiting member. Based on the limiting match between the steel ball and the sleeving hole and between the steel ball and the outer race of the bearing, at least the axial limit between the bearing and the pressure plate is fulfilled, and in this way, the bearing cannot separate (e.g., fall off) from the pressure plate. The pressure plate bearing device of the present disclosure has a simple structure that can be easily mounted and securely connected.

DETAILED DESCRIPTION OF THE EMBODIMENTS

Figure 1:
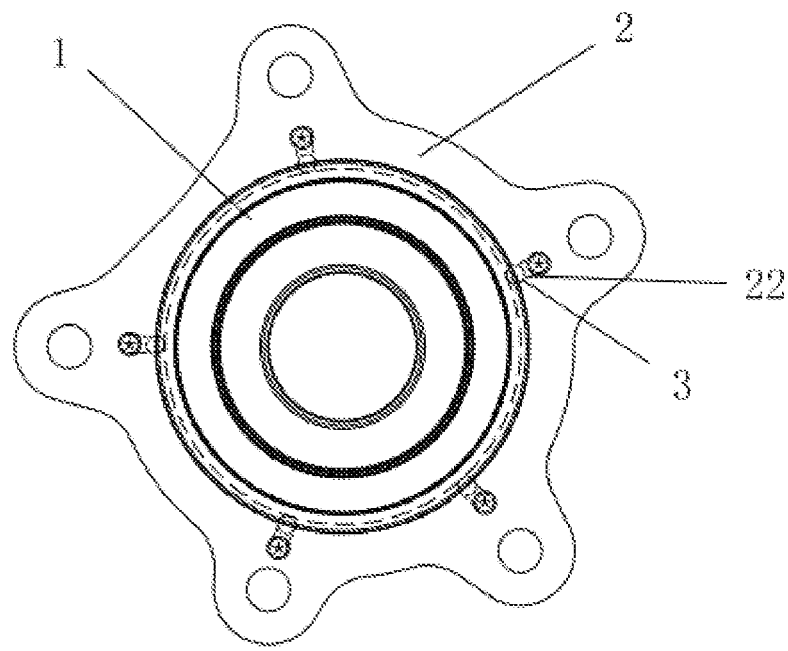
FIG. 1 is a structural diagram of a pressure plate bearing device assembled by quick connection in embodiment 1 of the present disclosure.
Figure 2:
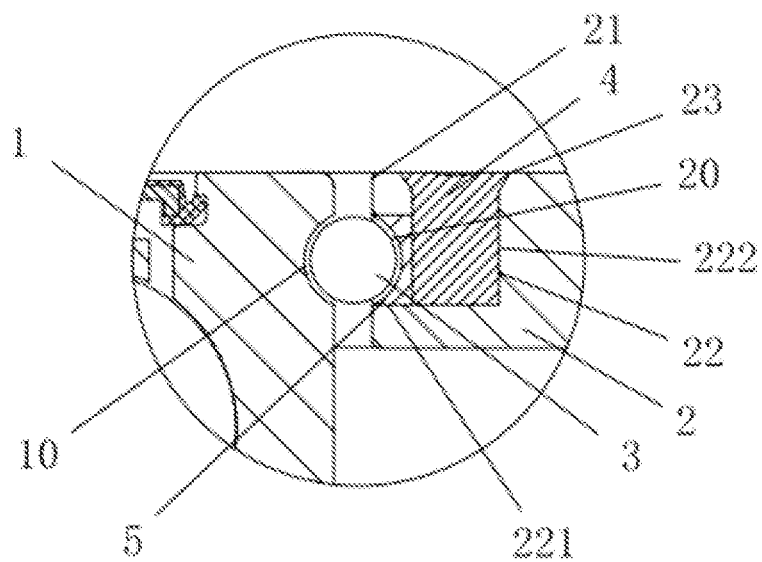
FIG. 2 is a partial view of the pressure plate bearing device assembled by quick connection in embodiment 1 of the present disclosure.
Figure 4:
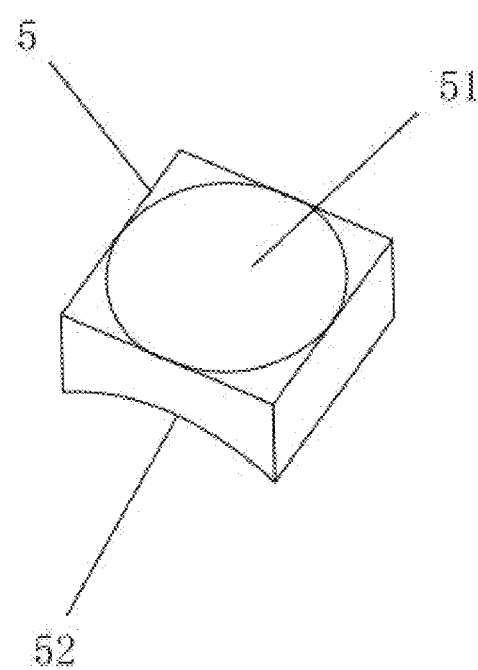
FIG. 4 is a structural diagram of a ball support of the pressure plate bearing device assembled by quick connection in embodiment 1 or 2 of the present disclosure.

As shown in FIG. 1, FIG. 2, and FIG. 4, a pressure plate bearing device assembled by quick connection in embodiment 1 of the present disclosure includes a bearing 1 and a pressure plate 2. The pressure plate 2 includes a sleeving hole 21 that sleeves outside an outer race of the bearing 1, limiting grooves formed in a position where the outer race of the bearing 1 is nested in the sleeving hole 21 in a matching manner, and steel balls 3 arranged in the limiting grooves. Based on the limiting match between the steel balls 3 and the sleeving hole 21 and between the steel balls 3 and the outer race of the bearing 1, the axial limit between the bearing 1 and the pressure plate 2 is fulfilled. Pressure plate 2 is provided with mounting channels 22 that are in communication with the limiting grooves. Limiting members 4 capable of limiting and holding the steel balls 3 in the limiting grooves are arranged in the mounting channels 22.

The mounting channel 22 is formed in the pressure plate 2, and each limiting groove includes an annular rolling groove 10 formed in an outer circumferential surface of the outer race of the bearing 1 and a groove 20 formed in an inner circumferential surface of the sleeving hole 21 of the pressure plate. A plurality of grooves 20 is evenly distributed around the center of bearing 1, and each groove 20 is correspondingly internally provided with one steel ball 3. These steel balls 3 are also arranged in the annular rolling grooves 10, and correspondingly, the pressure plate 2 is provided with a plurality of mounting channels 22 which are respectively matched with the grooves 20.

By adoption of the above structure, the steel ball 3 can roll along the annular rolling groove 10. In this way, the axial limiting match between the steel ball 3 and the pressure plate 2 and between the steel ball 3 and the outer race of the bearing 1 can be fulfilled, and the pressure plate 2 and the bearing 1 can rotate relative to each other so that rotational friction is further reduced.

In other embodiments, the mounting channel 22 may be formed in the outer race of bearing 1; the annular rolling groove 10 may be formed in an inner circumferential surface of the sleeving hole 21 of the pressure plate; the groove 20 may be formed in the outer circumferential surface of the outer race of the bearing 1.

The mounting channel 22 includes a radial extension section 221 and an axial extension section 222. A radial direction and an axial direction are determined based on the center of the bearing. One end of the radial extension section 221 is connected to the inner circumferential surface of sleeving hole 21, and the axial extension section 222 is provided with a mounting hole 23 at an axial end face on one side of the pressure plate 2. The limiting member 4 is fixed into the axial extension section 222 in a penetrating manner. A ball support 5 is movably arranged in the radial extension section 221. One end of the ball support 5 is provided with a ball socket 51 in rolling contact with the steel ball 3 in a matching manner. The groove 20 is provided by the ball socket 51. The other end of the ball support 5 abuts against the limiting member 4 in a matching manner to form a limit. When the steel ball 3 is mounted, the ball support 5 is pushed to an appropriate position close to the axial extension section 222, such that a groove allowing the steel ball 3 to be arranged therein is formed at one end of the radial extension section 221. The steel ball 3 can be mounted into the groove along the inner side of the sleeving hole 21. In this way, the steel ball 3 is not prone to falling off.

A screw fixed into the axial extension section 222 by threaded connection is adopted as the limiting member 4, and a thread matched with the screw is arranged on an inner side of the axial extension section 222.

To improve the supporting and matching effect of the ball support 5 and the screw, the other end of the ball support 5 is provided with a concave part 52 which fits a rod part of the screw. The inner side of the concave part 52 and the inner circumferential wall of the axial extension section 222 are provided with fitting threads, such that the ball support 5 is not likely to radially shake or cause abrasion to a contact part.

A guide part 26 is arranged at the mounting hole 23. The guide part 26 can be matched with the head of the screw for a limit to facilitate the mounting of the screw. The guide part 26 can also play a guiding role in the insertion of the screw to facilitate the mounting of the screw.

Figure 3:
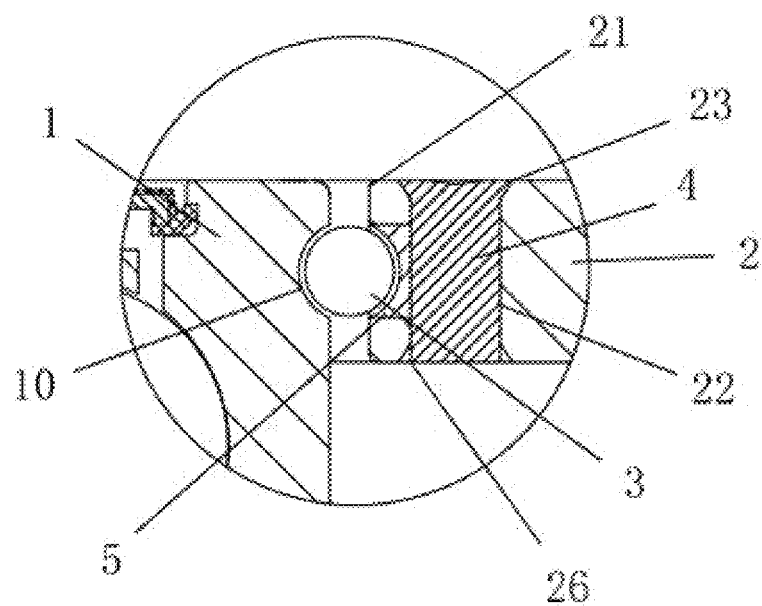
FIG. 3 is a partial view of the pressure plate bearing device assembled by quick connection in embodiment 2 of the present disclosure.

As shown in FIG. 3 and FIG. 4, a pressure plate bearing device assembled by quick connection in embodiment 2 of the present disclosure has a structure basically the same as that of the pressure plate bearing device assembled by quick connection in embodiment 1, except that an axial extension section 222 is provided with mounting holes 23 at axial end faces on two sides of a pressure plate 2. By using two mounting holes 23 formed in two axial end faces on two sides of the pressure plate 2, production, processing, and shaping of the mounting channel 22 and mounting of a limiting member 4 are facilitated, and a ball support 5 can be pushed to move towards a steel ball 3. A guide part is arranged at the mounting hole 23. The guide part is matched with the head of a screw for a limit to prevent the screw from excessively penetrating into the axial extension section 222.

Figure 5:
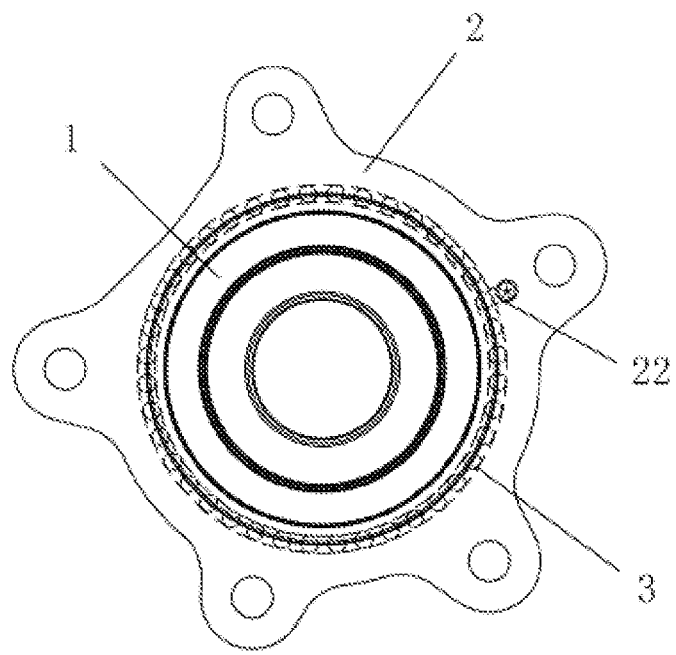
FIG. 5 is a structural diagram of a pressure plate bearing device assembled by quick connection in embodiment 3 of the present disclosure.
Figure 6:
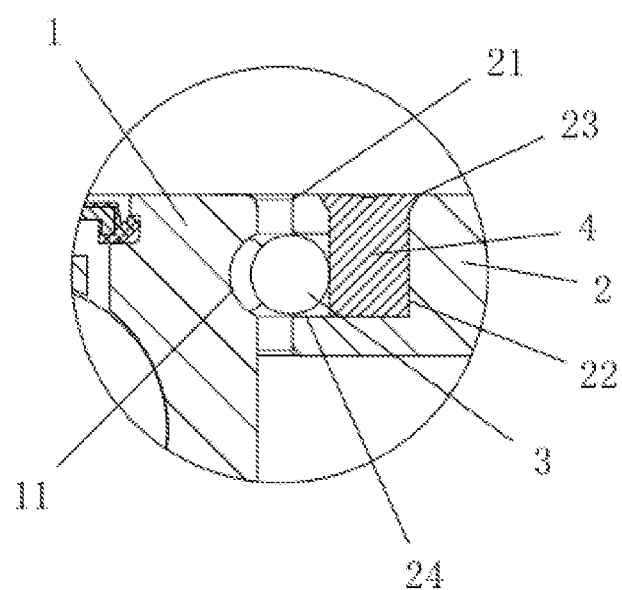
FIG. 6 is a partial view of the pressure plate bearing device assembled by quick connection in embodiment 3 of the present disclosure.

As shown in FIG. 5 and FIG. 6, a pressure plate bearing device assembled by quick connection in embodiment 3 of the present disclosure includes a bearing 1 and a pressure plate 2. The pressure plate 2 includes a sleeving hole 21 that sleeves outside an outer race of the bearing 1, limiting grooves formed in a position where the outer race of the bearing 1 is nested in the sleeving hole 21 in a matching manner, and steel balls 3 arranged in the limiting grooves. Based on the limiting match between the steel balls 3 and the sleeving hole 21 and between the steel balls 3 and the outer race of the bearing 1, the axial limit between the bearing and the pressure plate is fulfilled. The outer race of bearing 1 or the pressure plate 2 is provided with a mounting channel 22 that is in communication with the limiting groove. A limiting member 4 capable of limiting and holding the steel ball 3 in the limiting groove is arranged in the mounting channel 22.

The mounting channel 22 is formed in the pressure plate 2, and each limiting groove includes a first annular rolling groove 11 formed in an outer circumferential surface of the outer race of the bearing 1 and a second annular rolling groove 24 formed in an inner circumferential surface of the sleeving hole 21 of the pressure plate. An annular rollaway nest is formed by the combination of the first annular rolling grooves 11 and the second annular rolling grooves 24, and a plurality of steel balls 3 are arranged in the rollaway nest. To make pressure plate 2 and bearing 1 bear stress more uniformly, steel balls 3 substantially fill the rollaway nest.

At least one mounting channel 22 is configured, such that the steel ball 3 is mounted into the limiting groove via the mounting channel 22. One end of the mounting channel 22 is connected to the second annular rolling groove 24, and the other end of the mounting channel 22 is connected to an axial end face on a side of the pressure plate 2 to form a mounting hole 23 in the axial end face. The limiting member 4 is arranged at the mounting hole 23, and a screw or other fasteners are adopted as the limiting member 4. In a case where the limiting member 4 is mounted into the mounting hole 23, the steel ball 3 is prevented from falling off so that the reliability is improved.

A guide part is also arranged at the mounting hole 23, and in this embodiment, the guide part can play a guiding role in the arrangement of the steel ball 3.

Figure 7:
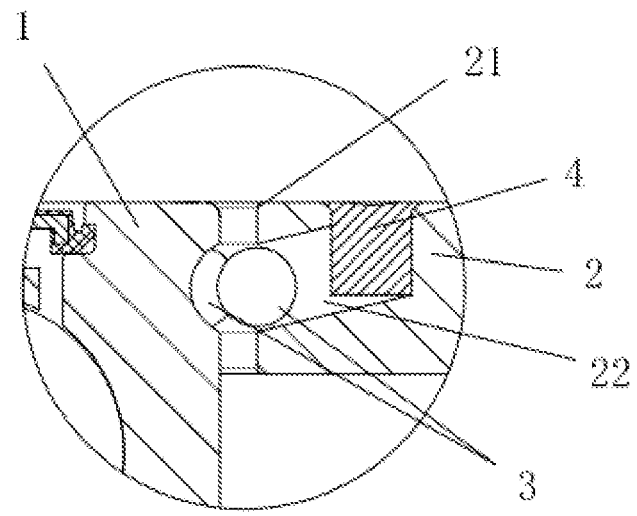
FIG. 7 is a partial view of the pressure plate bearing device assembled by quick connection in embodiment 4 of the present disclosure.

As shown in FIG. 7, a pressure plate bearing device assembled by quick connection in embodiment 4 of the present disclosure has a structure that is basically the same as that of the pressure plate bearing device assembled by quick connection in embodiment 3, except that a mounting channel 22 is arranged obliquely. By the oblique arrangement of the mounting channel 22, a steel ball 3 can automatically roll into a limiting groove by gravity when mounted, so that the mounting is further facilitated.

Figure 8:
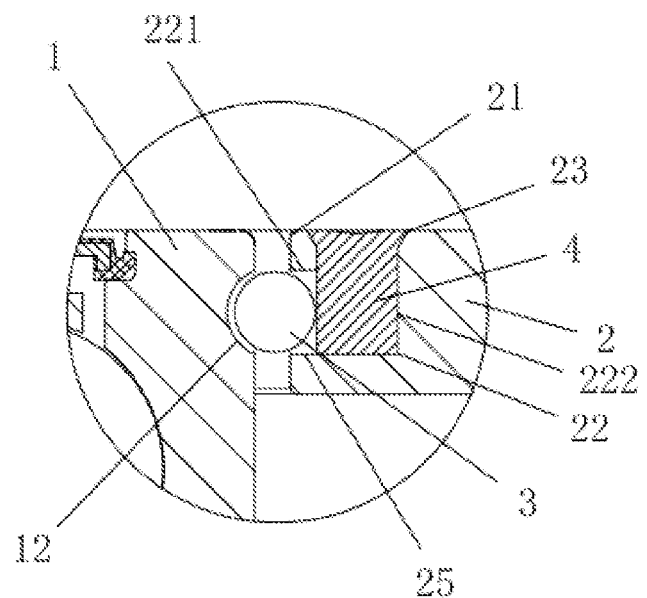
FIG. 8 is a partial sectional view of a pressure plate bearing device assembled by quick connection in embodiment 5 of the present disclosure.

As shown in FIG. 8, a pressure plate bearing device assembled by quick connection in embodiment 5 of the present disclosure includes bearing 1 and a pressure plate 2. The pressure plate 2 includes a sleeving hole 21 which sleeves outside an outer race of the bearing 1, limiting grooves formed in a position where the outer race of the bearing 1 is nested in the sleeving hole 21 in a matching manner, and steel balls 3 arranged in the limiting grooves. The outer race of bearing 1 or pressure plate 2 is provided with mounting channels 22 that are in communication with the limiting grooves. A limiting member 4 capable of limiting and holding the steel ball 3 in the limiting groove is arranged in the mounting channel 22.

In this embodiment, a plurality of limiting grooves is evenly distributed around the center of bearing 1. Each limiting groove includes a first groove 12 formed in an outer circumferential surface of the outer race of the bearing 1 and a second groove 25 formed in an inner circumferential surface of the sleeving hole 21 of the pressure plate. A plurality of mounting channels 22 correspondingly connected to and matching the second grooves 25 are formed in the pressure plate 2. Based on the limiting match between the steel balls 3 and the sleeving hole 21 and between the steel balls 3 and the outer race of the bearing 1, the axial and circumferential limiting match between the bearing 1 and the pressure plate 2 is fulfilled.

The mounting channel 22 includes a radial extension section 221 and an axial extension section 222. One end of the radial extension section 221 is connected to the inner circumferential surface of sleeving hole 21, and the axial extension section 222 is provided with a mounting hole 23 at an axial end face on one side of the pressure plate 2. The limiting member 4 is fixed into the axial extension section 222 in a penetrating manner and abuts against the steel ball 3 in a matching manner to form a limit. The groove 12 is formed at one end of the radial extension section 221.

A guide part is arranged at the mounting hole 23, and the guide part can play a guiding role in the arrangement of the steel ball 3.

The above embodiments are just some of the preferred specific embodiments of the present disclosure, and normal variations and substitutions made by those skilled in the art within the scope of the technical solution of the present disclosure shall fall within the protection scope of the present disclosure.

What is claimed is:

1. A pressure plate bearing device comprising:
 a bearing, and
 a pressure plate comprising:
  a sleeving hole located around the outside of an outer race of the bearing;
  a limiting groove provided in a position where the outer race of the bearing is nested in the sleeving hole; and
  a steel ball arranged in the limiting groove;
 wherein a connection between the steel ball and the sleeving hole and a connection between the steel ball and the outer race of the bearing at least form an axial limit between the bearing and the pressure plate;
 wherein the outer race of the bearing or the pressure plate is provided with a mounting channel in communication with the limiting groove; and
 wherein a limiting member configured for limiting and holding the steel ball in the limiting groove is arranged in the mounting channel;
 wherein the limiting groove further comprises an annular rolling groove and a groove;
 wherein the mounting channel is provided in the pressure plate;
 wherein the annular rolling groove is provided in an outer circumferential surface of the outer race of the bearing;
 wherein the groove is provided in an inner circumferential surface of the sleeving hole of the pressure plate;
 wherein the mounting channel further comprises a radial extension section and an axial extension section,
 wherein one end of the radial extension section is connected to the inner circumferential surface of the sleeving hole;
 wherein the axial extension section is provided with a mounting hole at an axial end face on at least one side of the pressure plate;
 wherein the limiting member is fixed into the axial extension section; and
 wherein a ball support is movably arranged in the radial extension section; and a first end of the ball support is provided with a ball socket in rolling contact with the steel ball, and a second end of the ball support abuts against the limiting member for a limit.

2. The pressure plate bearing device according to claim 1, the mounting channel further comprising a radial extension section and an axial extension section,
 wherein a first end of the radial extension section is connected to the inner circumferential surface of the sleeving hole; and
 wherein the axial extension section is provided with a mounting hole at an axial end face on at least one side of the pressure plate;

wherein the limiting member abuts against the steel ball to form a limit; and wherein the groove is formed at a second end of the radial extension section.

3. The pressure plate bearing device according to claim 2, wherein a guide part is arranged at the mounting hole.

4. The pressure plate bearing device according to claim 1, wherein a guide part is arranged at the mounting hole.

5. The pressure plate bearing device according to claim 1, wherein the limiting member is a screw fixed into the axial extension section by a threaded connection.

6. The pressure plate bearing device according to claim 5, wherein the second end of the ball support is provided with a concave part, the concave part fits a rod part of the screw, and an inner side of the concave part and an inner circumferential wall of the axial extension section are provided with fitting threads.

7. The pressure plate bearing device according to claim 1, the limiting groove further comprising a first annular rolling groove and a second annular rolling groove, wherein the mounting channel is provided in the pressure plate, and wherein the first annular rolling groove is provided in an outer circumferential surface of the outer race of the bearing, and wherein the second annular rolling groove is provided in an inner circumferential surface of the sleeving hole of the pressure plate.

8. The pressure plate bearing device according to claim 7, wherein a first end of the mounting channel is connected to the second annular rolling groove, and a second end of the mounting channel is connected to an axial end face on a side of the pressure plate to form a mounting hole in the axial end face; and the limiting member is arranged at the mounting hole.

9. The pressure plate bearing device according to claim 8, wherein the mounting channel is arranged obliquely to the pressure plate.

10. The pressure plate bearing device according to claim 8, wherein a guide part is arranged at the mounting hole.

\* \* \* \* \*